June 24, 1941.  H. NICOLAI  2,246,810
CONVEYER CHAIN
Filed Nov. 21, 1938
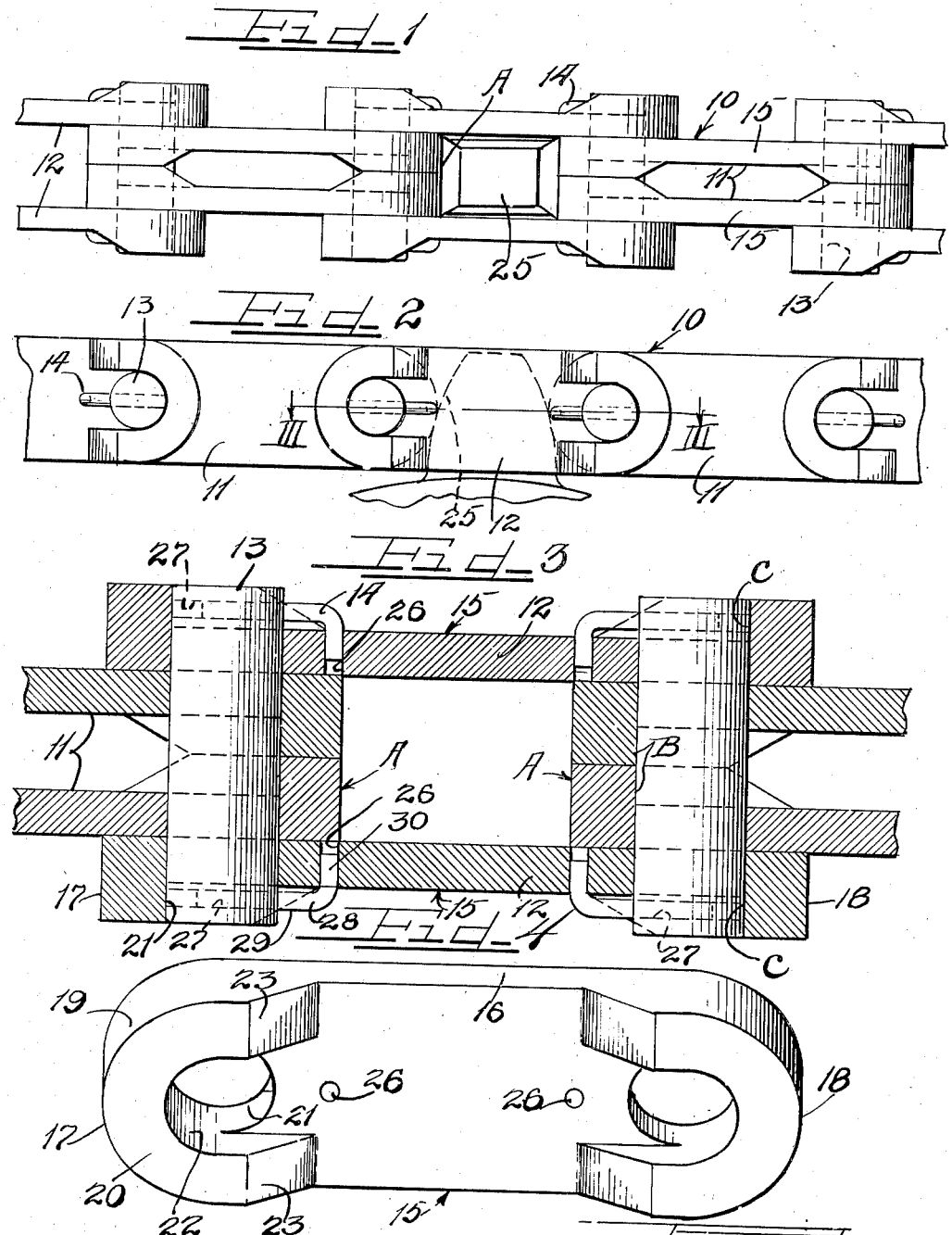
Inventor
Harold Nicolai.

Patented June 24, 1941

2,246,810

UNITED STATES PATENT OFFICE 2,246,810

CONVEYER CHAIN

Harold Nicolai, Chicago, Ill., assignor to Houdaille-Hershey Corporation, Detroit, Mich., a corporation of Michigan Application November 21, 1938, Serial No. 241,495

1 Claim. (Cl. 74—250)

This invention relates to a conveyer chain and more particularly to a conveyer chain formed entirely of highly heat-resistant metal for use in high temperature furnaces.

It has heretofore been customary to make conveyer chains with the links formed of a pair of flat metal plates and a roller positioned between the ends of the pair of plates, through which and the plate ends extends a connecting pin. In such construction, the bearing area between the links and the pin, and between the roller and the pin, is not sufficient to resist abnormal and excessive wear. As a result, the holes in the links and in the roller become elongated, so that these elements have to be replaced frequently.

In accordance with my present invention, the inner and outer links of the conveyer chain are formed of identical plate members, each of the plate members having a shrouded end to provide a bearing surface of increased area when the plate members of the inner links are mated with their shrouded ends facing inwardly and the link members of the outer links are positioned in reverse relationship, that is with their shrouded ends facing outwardly. By means of this arrangement, it is possible to eliminate entirely the roller, or spacer, heretofore used in conveyer chains, while at the same time providing ample bearing surface to resist wear. A wire key is inserted through holes drilled in the ends of the pins and in the outer link plate members to retain the chain elements in assembled relationship.

It is therefore an important object of this invention to provide a chain conveyer formed entirely of heat resistant metal and with the inner and outer links composed of identical plate members having shrouded ends, the plate members of the outer links being reversed, whereby the shrouded ends provide extended bearing surfaces between the links and the pins and between the links and the driving sprockets.

It is a further important object of this invention to provide a conveyer chain of simple yet rugged construction, wherein the links are formed of identical plate members provided with enlarged integral end portions presenting extended bearing surfaces to resist wear, whereby the use of a separate roller, or spacer, between the link members is eliminated.

Other and further important objects of this invention will be apparent from the disclosures in the specification and the accompanying drawing.

This invention (in a preferred form) is illustrated in the drawing and hereinafter more fully described.

On the drawing:

Figure 1 is a top plan view of a fragment of a conveyer chain embodying the principles of my invention, showing a single sprocket tooth in driving position.

Figure 2 is a fragmentary side elevational view of the same.

Figure 3 is an enlarged sectional view taken substantially along the line III—III of Fig. 2.

Figure 4 is a perspective view of a single link element or plate member.

As shown on the drawing:

The reference numeral 10 indicates generally a conveyer chain embodying the principles of my invention and comprising inner links 11 and outer links 12, pins 13 pivotally connecting corresponding ends of said inner and outer links and wire keys 14 serving to retain the pins and link ends in assembled relationship. The links, pins and keys are preferably all made of a highly heat resistant metal alloy, such as "Nichrome," or other alloy of nickel and chromium. It will be understood, however, that where the conveyer chain is not intended for use in high temperature furnaces, any other suitable material may be used in its manufacture.

Each of the inner links 11 and outer links 12 is composed of a pair of identical plate members 15, which may be either a casting or forging, preferably the latter. As best shown in Fig. 4, each plate member comprises an elongated body portion 16 having rounded shrouded ends 17 and 18, the shrouds lying on one lateral face only of the body portion 16. Each shroud consists of an abutment formed integrally with the body portion 16 to provide a rounded end wall 19 and a plane lateral face 20, said lateral face 20 being parallel with the plane of the lateral faces of the body portion 16. A bore 21 is formed adjacent each end of the body portion 16, the inner wall 22 of the adjacent shroud forming a continuation of the inner wall of said bore 21. In this way there is provided a bearing surface, including the inner wall 22, for the full width or thickness of the body portion 16 plus the thickness of the shroud. The shrouds 17 and 18 do not extend completely about the pin receiving bores 21 but are of U-shape, with sloping surfaces 23 extending from the plane lateral faces 20 down to the lateral face of the body portion 16.

Each of the inner links 11 comprises a pair of such plate members 15 arranged with their plane faces 20 in mating contact, that is, with the shrouded ends 17 and 18 facing inwardly. Each of the outer links, on the other hand, comprises a pair of the plate members 15 with their shrouded ends reversed, or in outwardly facing relationship. With the outer and inner links so constituted and with the corresponding bores 22 in alignment for receiving the pins 13, it is evident that the shrouded ends of the inner links provide an extensive bearing surface, as indicated at A (Figs. 1 and 3) for engagement with the driving face of a sprocket 25, while the inner walls of the shrouded ends of both the inner and outer link members provide an extensive area of bearing contact with the pins 13, as indicated at B and C, respectively (Fig. 3).

The outer plate members 15 are provided with holes 26 extending through the body portion 16 thereof adjacent the bores 21 and with their centers on the center lines of said bores. Each of the pins 13 is provided adjacent its ends with a transverse bore 27 extending completely therethrough. In assembling the chain elements, wire keys 28 serve to retain the pins 13 in place. Each of said wire keys 28 is provided with a long leg 29 that extends into a bore 27 in the end of a pin 13, and with a short leg 30 that extends into one of the holes 26 in an outer link plate member. The short end 30 can be sprung into place in a hole 26 and owing to the resiliency of the wire will be held in place against displacement. This arrangement makes it possible for the pins 13 to be made cylindrical throughout their lengths and without heads, so that the ends of said pins will lie flush with the outer surfaces 20 of said outer links.

It will thus be seen that I have provided a simple, yet rugged construction of conveyer chain, wherein the bearing surfaces are so extensive as to reduce the amount of wear to a minimum.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

In a conveyer chain having inner and outer links each comprising a pair of identical plates, each plate having on one side a continuous plane face and having on the other side at each end a raised integral U-shaped shroud provided with plane faces parallel to said continuous plane face, there being a pin receiving bore in each plate end partially enclosed by a shroud and a key receiving aperture in the body of the plate inwardly of each bore, the plates of each said outer link being arranged with the raised shrouds directed outwardly and the plates of each said inner link being arranged with the raised shrouds directed toward each other and in contact throughout their respective U-shaped plane surfaces, and with the bores of the corresponding inner and outer link plates in alignment, means connecting and retaining said links in operative relationship comprising a headless pin extending through each set of aligned bores with the end faces of said pin flush with the adjacent U-shaped plane surfaces of an outwardly directed shroud, each pin being provided with a transverse key receiving bore at each end thereof, and a spring wire key positioned in each of said key receiving bores and having a bent end sprung into the adjacent one of said key receiving apertures in an outer link.

HAROLD NICOLAI.